(12) United States Patent
MacKarvich

(10) Patent No.: US 7,131,658 B2
(45) Date of Patent: Nov. 7, 2006

(54) TRAILER HITCH GUIDE

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 103 days.

(21) Appl. No.: 11/078,054

(22) Filed: Mar. 11, 2005

(65) Prior Publication Data

US 2006/0208455 A1 Sep. 21, 2006

(51) Int. Cl.
*B60D 1/36* (2006.01)
*B60D 1/06* (2006.01)

(52) U.S. Cl. ..................... 280/477; 280/511
(58) Field of Classification Search ................ 280/477, 280/511
See application file for complete search history.

(56) References Cited

U.S. PATENT DOCUMENTS

| | | | | |
|---|---|---|---|---|
| 2,197,157 A * | 4/1940 | Reynolds | ..................... | 280/477 |
| 4,254,968 A * | 3/1981 | DelVecchio | ................. | 280/477 |
| 4,781,394 A | 11/1988 | Schwarz et al. | ............ | 280/477 |
| 4,840,392 A | 6/1989 | Baskett | ........................ | 280/477 |
| 4,871,185 A | 10/1989 | Chakroff et al. | ............ | 280/477 |
| 4,974,866 A | 12/1990 | Morgan | ....................... | 280/477 |
| 5,005,852 A * | 4/1991 | Smyly, Sr. | ................... | 280/477 |
| 5,080,386 A | 1/1992 | Lazar | .......................... | 280/477 |
| 5,203,582 A * | 4/1993 | Smyly, Sr. | ................... | 280/477 |
| 5,277,446 A * | 1/1994 | Hamel | ........................ | 280/477 |
| 5,316,330 A * | 5/1994 | Bergeron | ..................... | 280/477 |
| 5,330,196 A | 7/1994 | Ricles | .......................... | 280/477 |
| 5,454,582 A * | 10/1995 | Rines | .......................... | 280/477 |
| 5,465,992 A | 11/1995 | Anderson | ................... | 280/477 |
| 5,503,422 A | 4/1996 | Austin | ........................ | 280/477 |
| 5,516,139 A | 5/1996 | Woods | ........................ | 280/477 |
| 5,529,330 A | 6/1996 | Roman | ....................... | 280/477 |
| 5,697,630 A | 12/1997 | Thompson et al. | ......... | 280/477 |
| 5,725,232 A | 3/1998 | Fleming | ..................... | 280/477 |
| 5,758,893 A | 6/1998 | Schultz | ....................... | 280/477 |
| 5,927,742 A * | 7/1999 | Draper | ....................... | 280/477 |
| 6,102,422 A | 8/2000 | Damron | ..................... | 280/477 |
| 6,234,510 B1 | 5/2001 | Hammons | .................. | 280/477 |
| 6,382,653 B1 | 5/2002 | Bass | .......................... | 280/477 |
| 6,796,573 B1 | 9/2004 | Beaudoin | .................... | 280/477 |
| 2003/0218313 A1 | 11/2003 | Beaudoin | .................... | 280/477 |
| 2006/0076755 A1* | 4/2006 | Bergeron | ..................... | 280/509 |

* cited by examiner

*Primary Examiner*—Lesley D. Morris
*Assistant Examiner*—Marc A. Scharich
(74) *Attorney, Agent, or Firm*—Thomas, Kayden, Horstemeyer & Risley, LLP

(57) ABSTRACT

The trailer hitch (10) includes a guide bar (25) threaded about the stem (20) of the hitch ball (18). An alignment plate (45) that is rigidly mounted to the lower wall of the trailer tongue (34) has converging guide surfaces (50 and 51) that receive the guide bar (25), causing the guide bar and the crotch of the converging surfaces to become aligned as the guide bar engages the alignment plate. This aligns the ball receiving socket (42) of the coupler (40) with the hitch ball (18).

21 Claims, 3 Drawing Sheets

TRAILER HITCH GUIDE

FIELD OF THE INVENTION

This invention concerns a trailer hitch with a guide that guides the towing vehicle and the tongue of a trailer together in response to the rearward movement of the towing vehicle into engagement with the trailer tongue.

BACKGROUND OF THE INVENTION

Trailer hitches for small vehicles usually include a hitch ball that is connected to the ball hitch receiver carried by a towing vehicle. The trailer usually includes a forwardly extending trailer tongue that includes a coupler having a downwardly facing ball socket that is to be placed over and pivotally connects to the hitch ball.

When the towing vehicle is to be connected to the trailer, the operator typically elevates the trailer tongue so that the ball socket of the coupler is at a slightly higher level than the level of the hitch ball that is carried by the towing vehicle. The operator backs the towing vehicle toward the anticipated position of the socket of the coupler until the operator estimates that the hitch ball is aligned below the socket of the coupler. The operator then stops the vehicle and lowers the trailer tongue until the socket registers with the hitch ball and the trailer is securely mounted to the hitch ball.

Generally, a problem encountered with the previously described process is that the operator of the towing vehicle cannot see the hitch ball and the coupler as he/she manipulates the vehicle toward the trailer and the hitch ball is likely to come to rest at a position that is not aligned with the coupler. Even if the operator is able to see the coupler, etc., the maneuverability of the vehicle is somewhat limited so that it is rare that perfect alignment of the hitch ball and coupler is achieved when backing the towing vehicle.

Various trailer alignment devices have been developed in the prior art. The prior art alignment devices for aligning the hitch ball of a towing vehicle and the coupler of a trailer usually have utilized an alignment means mounted to the rear of the towing vehicle, whereby the engagement of the alignment means of the towing vehicle against the coupler of the trailer tends to urge the coupler in a lateral direction with respect to the vehicle until the socket of the coupler is substantially aligned over the hitch ball. U.S. patents that disclose these types of devices include Morgan U.S. Pat. No. 4,974,866, Lazar U.S. Pat. No. 5,080,386, Ricles U.S. Pat. No. 5,330,196, Anderson U.S. Pat. No. 5,465,992, Austin U.S. Pat. No. 5,503,422, and Woods U.S. Pat. No. 5,516,139. Since these devices are usually permanently attached to the rear of the towing vehicle, they may be obstructive with regard to some other activities about the rear of the vehicle. Also, these devices usually directly contact the coupler of the trailer, and the coupler of a typical trailer is not manufactured with the anticipation that it will be repeatedly impacted by the hitch guide of the towing vehicle, thereby becoming damaged over a period of time.

Another trailer hitch guide is disclosed in Beaudoin U.S. Patent Publication 2003/0218313 A1, in which a V-shaped hitch guide is mounted to a trailer tongue and appears to engage the hitch ball of the towing vehicle as the vehicle backs toward the trailer so as to guide the hitch ball to a position beneath the socket of the coupler. A disadvantage of the device is that the hitch guide is operated at the level of the hitch ball and therefore depends on contact with the hitch ball, and the hitch guide must be moved out of the way in order to allow the socket of the coupler to move downwardly into engagement with the hitch ball of the towing vehicle.

This invention concerns a trailer hitch guide that is carried by the tongue of the trailer and the hitch ball of the towing vehicle that is located at a level below the anticipated position of the hitch ball when the hitch ball is moved by the towing vehicle into alignment with the socket of the coupler and guides the coupler and hitch ball toward alignment, such that once aligned, the trailer tongue can be lowered into coupling engagement with the hitch ball without further movement of parts about the trailer and/or towing vehicle.

SUMMARY OF THE INVENTION

Briefly described, the present invention concerns a trailer hitch that includes an improved guide for vertically aligning the hitch ball of a towing vehicle and the ball socket of a coupler of a trailer tongue in response to the rearward movement of the towing vehicle into contact with the trailer.

The towing vehicle includes a vehicle mounting bar that is rigidly mounted to the frame of the towing vehicle. The trailer includes a trailer tongue with a hitch ball coupler mounted to the upper surface of the trailer tongue. The hitch ball coupler includes a downwardly facing socket for connection to the hitch ball of the towing vehicle. The trailer hitch includes a spherical hitch ball with a hitch ball support stem extending from the lower portion of the hitch ball for mounting to the vehicle mounting bar of the towing vehicle. The stem extends through an opening in the vehicle mounting bar so that the hitch ball rests on and extends upwardly from the vehicle mounting bar of the towing vehicle with the hitch ball positioned above the vehicle mounting bar. A guide bar is mounted to the support stem of the hitch ball and takes the place of the usual nut that attaches the stem to the vehicle mounting bar of the towing vehicle. Preferably, the guide bar has a cylindrical exterior surface with a threaded internal bore that takes the place of the connector nut, by being threaded onto the downwardly protruding stem of the hitch ball.

An alignment plate is mounted to the trailer tongue and defines a converging opening that extends forwardly of the trailer tongue for receiving the guide bar of the hitch ball as the guide bar approaches the trailer. The opening of the alignment plate includes angled guide surfaces that intersect at an apex or "crotch" for centering the crotch with respect to the guide bar in response to the guide bar engaging the angled surfaces.

Once the guide bar has been received in the alignment plate of the trailer, the socket of the coupler, the hitch ball, the guide bar, and the crotch of the alignment plate are all coaxially aligned. The operator then lowers the trailer tongue with the conventional jack or adjustable towing wheel until the socket of the coupler rests on the hitch ball. As the trailer tongue is lowered in this manner, the alignment plate also moves downwardly with the trailer tongue, staying in coaxial alignment with the guide bar, and coming to rest at a level where it is still at the level of the guide bar, so that the alignment plate pivots about the guide bar when the towing vehicle moves at an angle with respect to the trailer.

Thus, it is an object of this invention to provide an improved trailer hitch guide that automatically aligns the ball receiving socket of the coupler of the trailer and the hitch ball of the towing vehicle in response to the rearward movement of the towing vehicle toward the trailer.

Another object of this invention is to provide an improved trailer hitch that is inexpensive to construct and to maintain, that accurately aligns the trailer tongue and the towing vehicle, and which includes components that are rigidly fastened to either the towing vehicle or to the trailer tongue.

Other objects, features and advantages of the present invention will become apparent upon reading the following specification, when taken in conjunction with the accompanying drawings.

DETAILED DESCRIPTION

Figure 1:
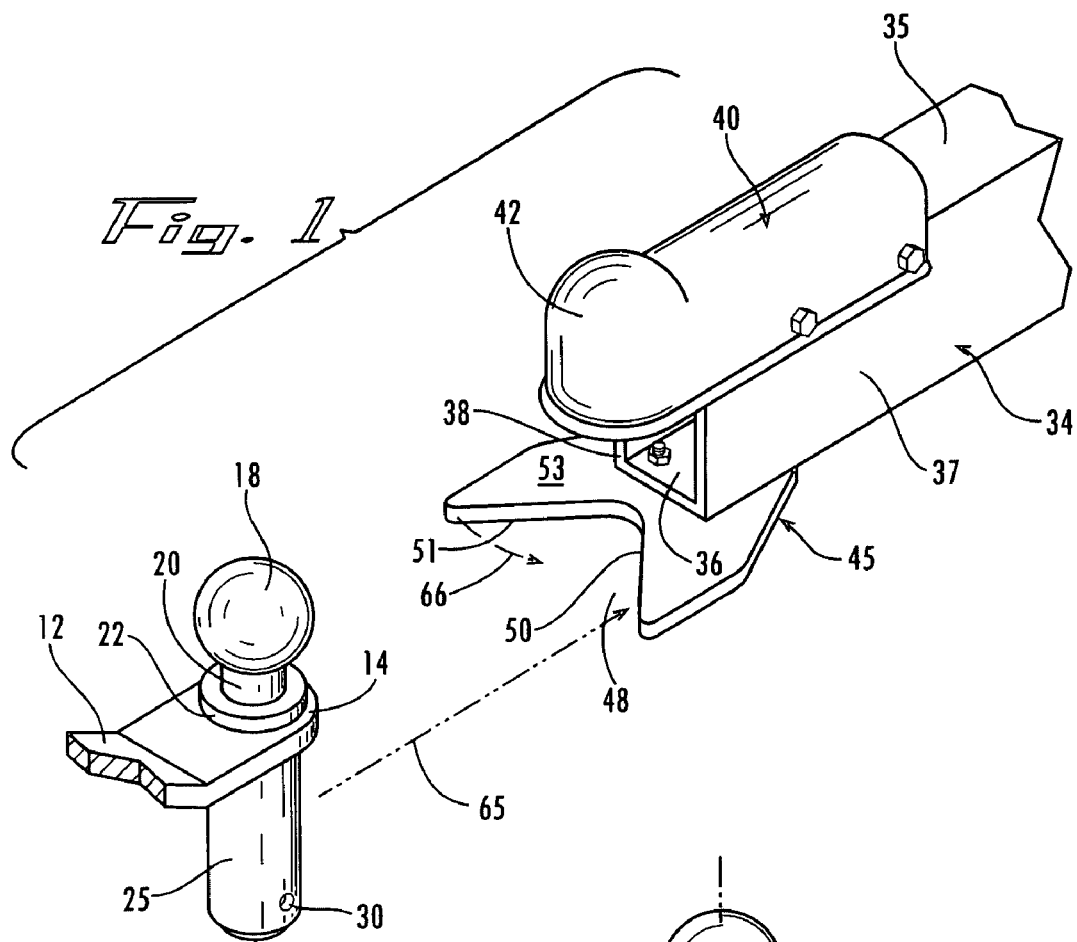
FIG. 1 is a perspective illustration of the ball hitch and guide bar mounted to the vehicle mounting bar, shown in spaced relationship with respect to the tongue of a trailer, with its coupler, ball receiver socket, and alignment plate.
Figure 2:
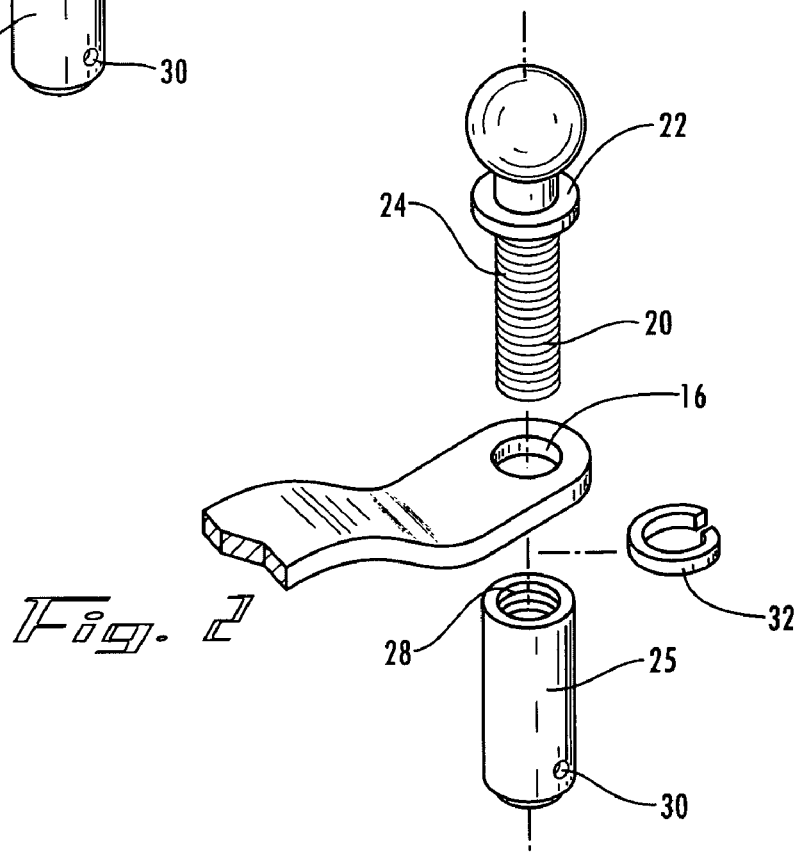
FIG. 2 is a perspective illustration of the hitch ball, its stem, the guide bar and the vehicle mounting bar, all expanded from each other.

Referring now in more detail to the drawings, in which like numerals indicate like parts throughout the several views, FIG. 1 illustrates the trailer hitch 10 that is mounted on the rear of a towing vehicle and the tongue of a trailer. The rear portion of the towing vehicle includes a vehicle mounting bar 12 that includes a metal strap that is rigidly mounted at one end (not shown) to the rear of the frame of the truck or other towing vehicle (not shown), and has a rearwardly extending terminal end portion 14 that projects rearwardly of the towing vehicle. As shown in FIG. 2, the terminal end portion 14 includes an opening 16 for receiving the hitch ball.

Hitch ball 18 has its hitch ball support stem 20 extending from the lower portion of the hitch ball and a collar 22 is formed about the stem adjacent the hitch ball. The lower portion of the hitch ball stem, below collar 22, includes helical threads 24 (FIG. 2). The hitch ball is mounted to the vehicle mounting bar 12 by extending the stem through the opening 16 of the receiver.

Guide bar 25 is mounted to the hitch ball support stem 20. Guide bar 25 has a cylindrical exterior surface and an internally threaded bore 28. A tightening hole 30 is formed in the lower end of the guide bar 25 so that an elongated tool can be inserted into the tightening hole and used to rotate the guide bar about the hitch ball support stem 20, so as to rigidly mount the guide bar to the lower portion of the hitch ball and to the vehicle mounting bar 12. A lock washer 32 may be extended about the support stem 20, between the bottom surface of the vehicle mounting bar 12 and the facing surface of the guide bar 25 to assure permanent and rigid connection of the guide bar to the hitch ball.

The towing tongue 34 of the trailer has its distal end extending forwardly of the trailer (not shown) and it includes a top wall 35, a bottom wall 36, and opposed side walls 37 and 38, formed in a rectangular cross-sectional configuration. A coupler 40 is rigidly mounted to the tongue 34, in overlying relationship with the upper wall 35, so that its downwardly facing ball receiver socket 42 overhangs the distal end of the tongue, for receiving the hitch ball 18 of the towing vehicle.

Figure 3A:
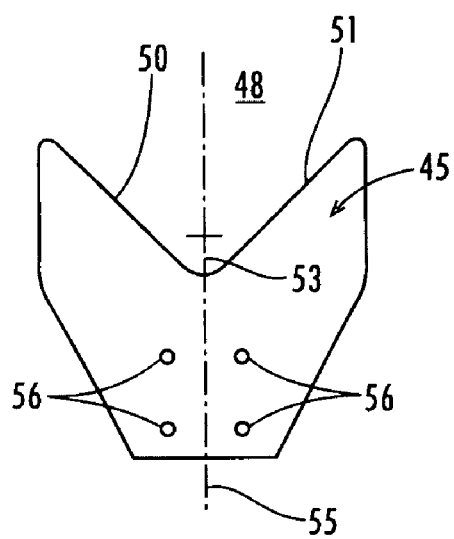
FIG. 3A is a plan view of the alignment plate.
Figure 5:
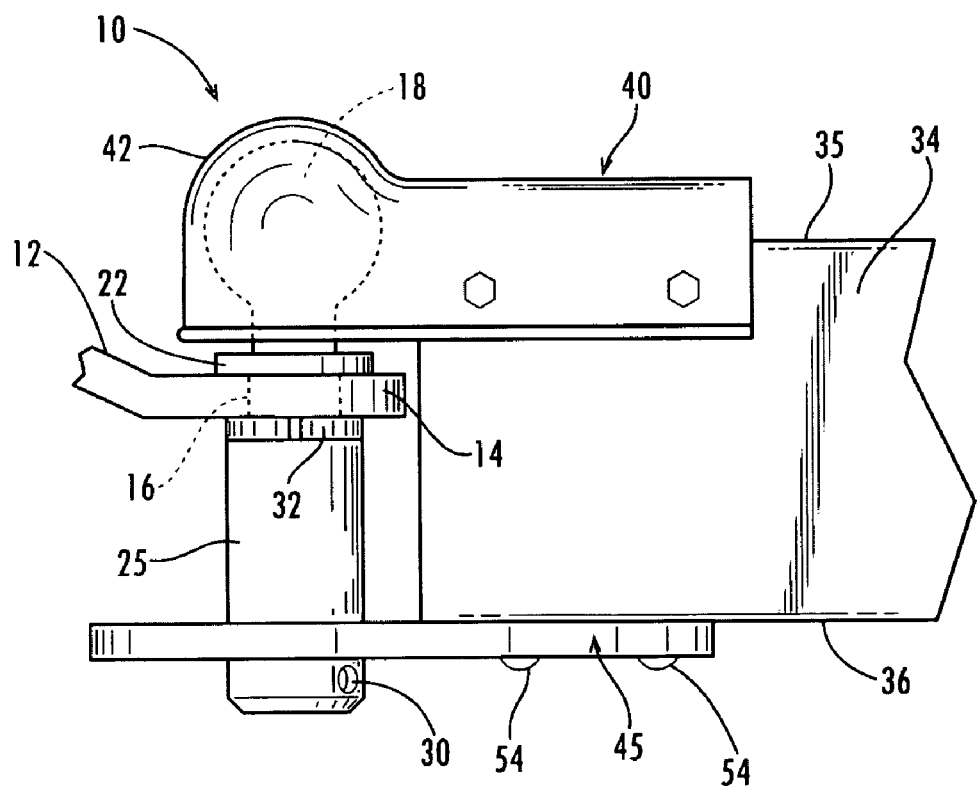
FIG. 5 is a side view of the assembled trailer hitch.

As shown in FIGS. 1 and 5, alignment plate 45 is mounted to the lower wall 36 of the trailer tongue 34. Alignment plate 45 may be formed of heavy gauge sheet metal, and it defines an alignment opening or slot 48 that faces forwardly of the tongue 34, toward the anticipated position of the hitch ball 18. Guide surfaces 50 and 51 form the alignment slot 48, and the guide surfaces are sloped with respect to each other so that they converge to an apex or "crotch" 53. Typically, the guide surfaces 50 and 51 will open 45 degrees away from the longitudinal center line 55 of the alignment plate. However, other angles can be employed to meet the functional requirements of the alignment plate, as will be more fully disclosed hereinafter. The alignment plate 45 is rigidly attached to the lower wall 36 of the trailer tongue 34 by fasteners 54 extending through the connector openings 56 (FIG. 3A) of the alignment plate. Other attachment means may be used as desired, such as by welding or clamping.

Figure 4:
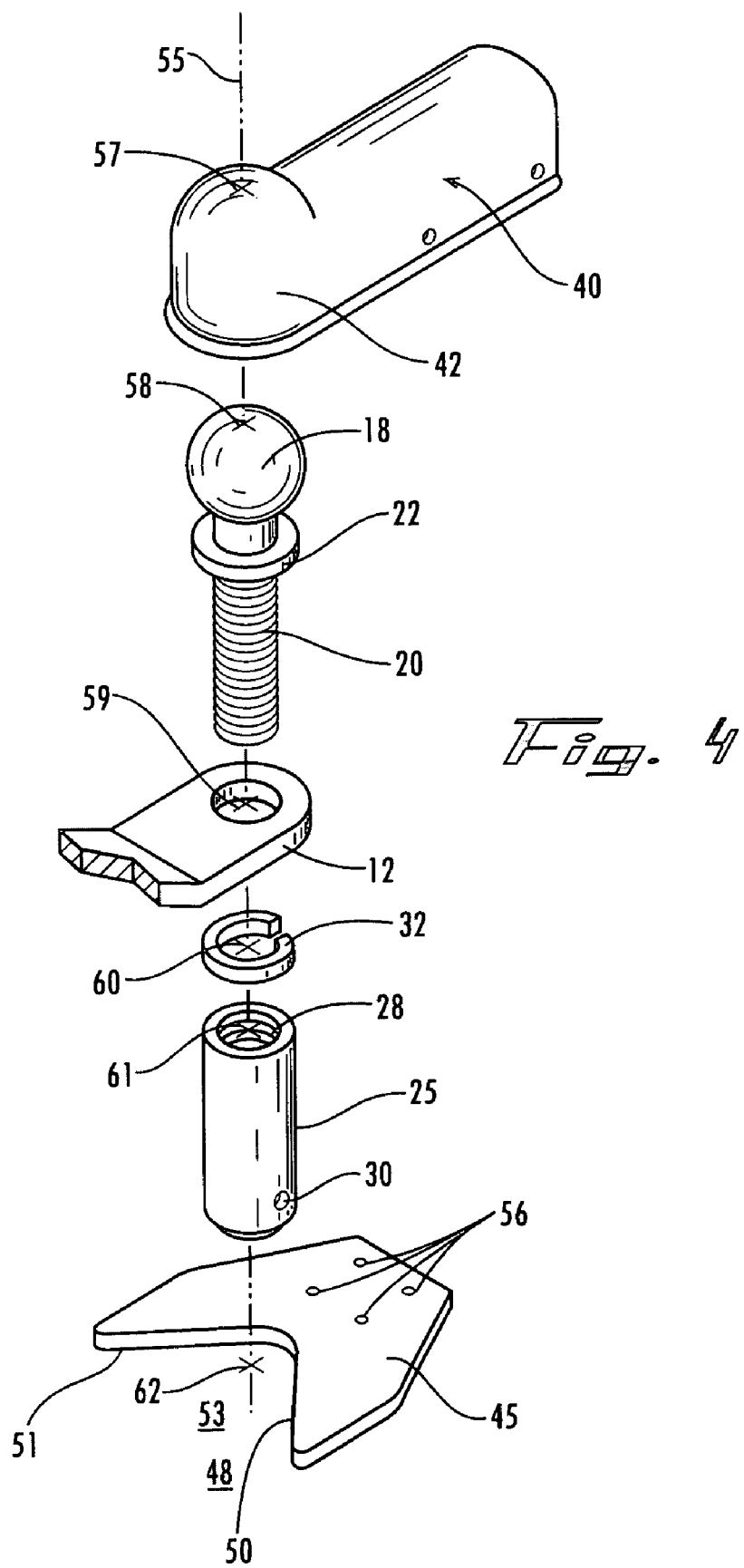
FIG. 4 is an expanded, perspective illustration of the trailer hitch.

As shown in FIG. 4, the respective radial centers 57, 58, 59, 60, 61 and 62 of the ball receiver socket 42, hitch ball 18, the opening 16 of the vehicle mounting bar 12, the lock washer 32, guide bar 25 and the crotch 53 of the alignment plate 45 are all in vertical alignment when the hitch ball 18 is received in the ball receiver socket 42. Since the ball receiver socket 42 and the alignment plate 45 are rigidly mounted to the towing tongue 34 of the trailer, their radial centers will always remain coaxial, and when the coupler 40 rotates with about the hitch ball 18, the alignment plate 45 will also rotate in unison with the coupler about the longitudinal axis of the hitch ball. Also, the coupler will simultaneously rotate with respect to the guide bar 25.

It will be noted that the external cylindrical surface of the guide bar 25 has no irregular external shapes so that it is free to move along its entire length through the alignment slot 48 of the alignment plate 45. Therefore, the alignment plate can be moved along the entire length of the guide bar 25 as the ball receiver socket 42 of the coupler moves downwardly into engagement with the hitch ball 18. Other external shapes of the guide bar may be used if desired as long as excessive wear are not experienced between these parts.

As shown in FIG. 1, when the vehicle is moved backward toward the trailer, so that the vehicle mounting bar 12 that is rigidly mounted to the vehicle and its hitch ball 18 advance toward the trailer tongue 34, the trailer tongue will have been elevated so that the hitch ball 18 passes beneath the ball receiver socket 42 of the coupler 40. However, the alignment plate 45 is mounted to the lower wall 36 of the trailer tongue, so that it is spaced significantly below the ball receiver socket, and usually does not contact the hitch ball 18, its stem 20, or the vehicle mounting bar 12, but normally engages the guide bar 25. If the guide bar is moved toward the alignment slot 48 of the alignment plate but out of alignment with the crotch 53, the guide bar engages one of the guide surfaces 50 or 51 of the alignment plate. The example shown in FIG. 1 shows the guide bar 25 moving toward engagement with the guide surface 50 as represented by the dash line and arrow 65. In response to the engagement of the guide bar 25 with the guide surface 50, the trailer tongue 34 tends to move in the direction indicated by dash line and arrow 66 until the guide bar reaches the crotch 53 of the alignment slot 48. This aligns the guide bar 25 and hitch ball 18 with the ball receiver socket 42 and alignment slot 48, respectively.

When the guide bar 25 first make contact with a guide surface of the alignment plate 45, there usually will be a sliding sound caused by the sliding contact of the guide bar against the guide surface 50 or 51 of the alignment plate; however, when the guide bar reaches the crotch 53 of the alignment plate, the sliding sound terminates and another sound emanates, signaling to the vehicle operator that the hitch ball has become aligned with the socket 42 of the coupler 40.

Figure 3B:
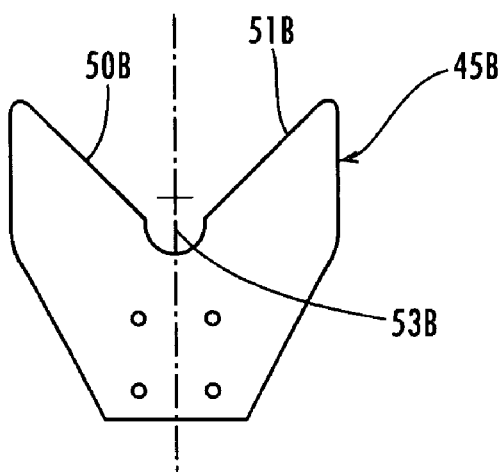
FIG. 3B is a plan view of a modified alignment plate.

FIG. 3B illustrates another form of the alignment plate 45B, wherein the crotch 53B is offset rearwardly of the apex of the guide surfaces 50B and 51B. This rearward displacement of the crotch forms a recess in which the guide bar 25 tends to seat when backed toward the trailer as previously described. This tends to hold the guide bar 25 in registration with the recessed crotch 53B and in vertical alignment with the socket 42 of the coupler 40 as the vehicle operator lowers the trailer tongue to seat the socket on the hitch ball.

It will be noted that if the operator of the towing vehicle backs the towing vehicle with too much force into engagement with the trailer tongue, the engagement of the guide bar 25 with the alignment slot 48 occurs before any other engagement of parts, such that the brunt of the engagement force will be encountered between the guide bar 25 and the alignment plate 45, thereby tending to protect the other components of the hitch from damage. Also, should there ever be an extreme compressive force between the towing vehicle and the trailer, at least a major portion of the compressive force will be encountered by the guide bar 25 and the alignment plate 45, tending to relieve some of the compressive force from the hitch ball and the coupler.

The alignment plate 45 has been illustrated as a flat heavy gauge metal piece, however, the alignment plate may be formed in other shapes that are not necessarily flat of or one piece construction. For example flanges, handles, connector tabs, bends and multiple piece goods and other shapes may be used if desired.

Although preferred embodiments of the invention has been disclosed in detail herein, it will be obvious to those skilled in the art that variations and modifications of the disclosed embodiments can be made without departing from the spirit and scope of the invention as set forth in the following claims.

What is claimed is:

1. A trailer hitch for connecting a trailer to the rear of a towing vehicle, said towing vehicle including a vehicle mounting bar, and said trailer including a trailer tongue with upper and lower surfaces, and a hitch ball coupler mounted on the upper surface of the trailer tongue including a ball receiver socket for connection to the towing vehicle, said trailer hitch comprising:
   a hitch ball and a hitch ball support stem extending from said hitch ball for mounting to the vehicle mounting bar of the towing vehicle with said hitch ball positioned above the vehicle mounting bar and said hitch ball support stem positioned below said vehicle mounting bar,
   a guide bar mounted to said hitch ball support stem and extending downwardly from said vehicle mounting bar,
   a guide bar alignment plate mounted to the trailer tongue and defining an opening for receiving said guide bar as said guide bar approaches said opening, and
   said opening of said alignment plate including angled surfaces intersecting at a crotch for centering said crotch with respect to said guide bar in response to said guide bar engaging said angled surfaces.

2. The trailer hitch of claim 1, wherein said guide bar is vertically aligned with said hitch ball.

3. The trailer hitch of claim 1, wherein said ball receiver socket is vertically aligned with said crotch of said alignment plate.

4. The trailer hitch of claim 1, wherein said guide bar, hitch ball, ball receiver socket and said crotch are substantially vertically aligned when said ball receiver socket is mounted on said hitch ball.

5. The trailer hitch of claim 1, wherein said alignment plate comprises a plate rigidly mounted to the lower surface of said trailer tongue, and said opening is substantially V-shaped.

6. A trailer hitch for connecting a trailer to the rear of a towing vehicle, the towing vehicle having a vehicle mounting bar and the trailer having a tongue, a hitch ball for mounting to said vehicle mounting bar and extending above said vehicle mounting bar, a guide bar for mounting to said vehicle mounting bar and extending below said vehicle mounting bar, and an alignment plate for mounting to a lower portion of said trailer tongue for receiving said guide bar, such that as the towing vehicle backs toward the tongue of the trailer the guide bar engages the alignment plate and guides the tongue of the trailer and the vehicle mounting bar toward alignment with each other.

7. The trailer hitch of claim 6, wherein said guide bar extends downwardly from said hitch ball.

8. The trailer hitch of claim 6, wherein said hitch ball includes a ball support stem mounted to said vehicle mounting bar, and said guide bar is connected to said support stem of said hitch ball.

9. The trailer hitch of claim 8, wherein said hitch ball and said guide bar are vertically aligned.

10. The trailer hitch of claim 6, wherein said trailer tongue includes a coupler with a downwardly facing socket for receiving said hitch ball, and said alignment plate includes a V-shaped guide surface having a crotch that receives said guide bar.

11. The trailer hitch of claim 6, wherein said alignment plate has converging guide surfaces, and said guide bar is mounted to said hitch ball for engaging said converging guide surfaces.

12. The trailer hitch of claim 11, wherein said guide bar is threadedly mounted to said hitch ball.

13. The trailer hitch of claim 11, wherein the converging guide surfaces of said alignment plate define a crotch forming a recess for receiving said guide bar.

14. A trailer hitch for a connecting a trailer to the rear of a towing vehicle, comprising
   a mounting bar mounted to and extending rearwardly of the towing vehicle,
   a hitch ball mounted on and extending upwardly of said mounting bar,
   a guide bar mounted to and extending downwardly from said mounting bar and said hitch ball,
   said trailer having a tongue,
   a coupler supported on said tongue,
   an alignment plate mounted to the trailer tongue and spaced below said coupler for receiving said guide bar,
   such that as the towing vehicle backs toward the tongue of the trailer the guide bar engages the alignment plate at a position below said coupler and the alignment plate guides the tongue of the trailer and the vehicle mounting bar toward alignment with each other.

15. The trailer hitch of claim 14, wherein:
   said alignment plate defines an alignment slot with converging guide surfaces for engagement with said guide bar and guiding said guide bar and said coupler toward vertical alignment.

16. The trailer hitch of claim 15, wherein
said coupler, said hitch ball, and said guide bar are vertically aligned when said coupler is mounted to said hitch ball.

17. A trailer hitch for connecting the tongue of a trailer to a hitch mounting bar of a towing vehicle, the tongue having an upper surface and a lower surface and the hitch mounting bar having an upper surface and a lower surface, comprising:
- a coupler mounted on the upper surface of the trailer tongue,
- an alignment plate mounted on the lower surface of the trailer tongue and spaced below said coupler,
- a hitch ball mounted on the upper surface of the hitch mounting bar,
- a guide bar mounted on the lower surface of the hitch mounting bar,
- such that as the towing vehicle moves the hitch ball toward the coupler the guide bar engages the alignment plate and the alignment plate moves the trailer tongue laterally so that the coupler becomes vertically aligned with the hitch ball.

18. The trailer hitch of claim 17, wherein said guide bar is vertically aligned with said hitch ball.

19. The trailer hitch of claim 1, wherein
said alignment plate includes converging guide edges that intersect at a crotch, and
said coupler includes a ball receiver socket that is vertically aligned with said crotch.

20. The trailer hitch of claim 17, wherein said guide bar, hitch ball, ball receiver socket and said crotch are vertically aligned when said ball receiver socket is mounted on said hitch ball.

21. The trailer hitch of claim 17, wherein said alignment plate comprises a plate rigidly mounted to the lower surface of said trailer tongue and a V-shaped slot for engagement by said guide bar.

* * * * *